US008352623B2

(12) United States Patent
Cherry et al.

(10) Patent No.: US 8,352,623 B2
(45) Date of Patent: Jan. 8, 2013

(54) SYSTEM FOR ENERGY EFFICIENT COMPUTER MANAGEMENT ENVIRONMENT VIA TIGHTLY INTEGRATED TARGET STATUS AND DIRECTED WORK SESSIONS

(75) Inventors: Gene Wayne Cherry, Austin, TX (US); Christopher Victor Lazzaro, Austin, TX (US); Dasgupta Ranjan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 699 days.

(21) Appl. No.: 12/212,295

(22) Filed: Sep. 17, 2008

(65) Prior Publication Data
US 2010/0070661 A1      Mar. 18, 2010

(51) Int. Cl.
G06F 15/16       (2006.01)
(52) U.S. Cl. .......... 709/230; 709/200; 709/206; 710/19
(58) Field of Classification Search ................. 709/200, 709/206, 230; 710/19
See application file for complete search history.

(56) References Cited

U.S. PATENT DOCUMENTS

| | | | |
|---|---|---|---|
| 5,870,540 A * | 2/1999 | Wang et al. ...................... 714/43 |
| 6,449,663 B1 * | 9/2002 | Carney et al. .................... 710/15 |
| 6,467,050 B1 * | 10/2002 | Keung ............................. 714/27 |
| 6,661,778 B1 * | 12/2003 | Trofin et al. .................... 370/252 |
| 6,757,730 B1 * | 6/2004 | Lee et al. ........................ 709/226 |
| 6,859,834 B1 | 2/2005 | Arora et al. |
| 7,051,337 B2 | 5/2006 | Srikantan et al. |
| 7,395,537 B1 * | 7/2008 | Brown et al. ................... 718/104 |
| 7,552,239 B2 * | 6/2009 | Jean et al. ...................... 709/249 |
| 2002/0124081 A1 * | 9/2002 | Primm et al. ................... 709/224 |
| 2002/0143923 A1 * | 10/2002 | Alexander ...................... 709/223 |
| 2003/0126229 A1 * | 7/2003 | Kantor et al. .................. 709/217 |
| 2004/0143645 A1 * | 7/2004 | Cheenath ....................... 709/218 |
| 2004/0158333 A1 * | 8/2004 | Ha et al. ............................ 700/3 |
| 2004/0172469 A1 * | 9/2004 | Takahashi et al. ............. 709/224 |
| 2005/0154794 A1 * | 7/2005 | Deshpande .................... 709/227 |
| 2005/0262226 A1 * | 11/2005 | Holloway et al. ............. 709/221 |
| 2006/0136421 A1 * | 6/2006 | Muthukrishnan et al. ...... 707/10 |
| 2006/0242320 A1 | 10/2006 | Nettle et al. |
| 2007/0186105 A1 * | 8/2007 | Bailey et al. ................... 713/168 |
| 2007/0232342 A1 * | 10/2007 | Larocca .......................... 455/518 |
| 2008/0168447 A1 * | 7/2008 | Lewis ............................. 718/102 |
| 2008/0180726 A1 * | 7/2008 | Selvaraj ....................... 358/1.15 |
| 2008/0189369 A1 * | 8/2008 | Chandrasekaran et al. .. 709/206 |
| 2009/0077159 A1 * | 3/2009 | Murakami ..................... 709/202 |
| 2009/0125627 A1 * | 5/2009 | Ford .............................. 709/227 |
| 2009/0138551 A1 * | 5/2009 | Hubbard ....................... 709/203 |
| 2009/0138682 A1 * | 5/2009 | Capps et al. ................... 712/220 |

FOREIGN PATENT DOCUMENTS
WO     WO 2004042586 A1 *    5/2004

* cited by examiner

*Primary Examiner* — John Follansbee
*Assistant Examiner* — Anthony Mejia
(74) *Attorney, Agent, or Firm* — Yee & Associates, P.C.; Jeffrey S. LaBaw

(57) ABSTRACT

A method and system for providing an energy efficient computer management environment via tightly integrated target status and directed work sessions. The illustrative embodiments query, by a lightweight communication means, an availability status of a target computer device using a status thread. The status of the target computer device is recorded in a memory of a central computer according to response from the server thread. Responsive to an absence of a response by the target computer, the illustrative embodiments query, by a heavyweight communication means, the status of the target computer device using the status thread.

19 Claims, 4 Drawing Sheets

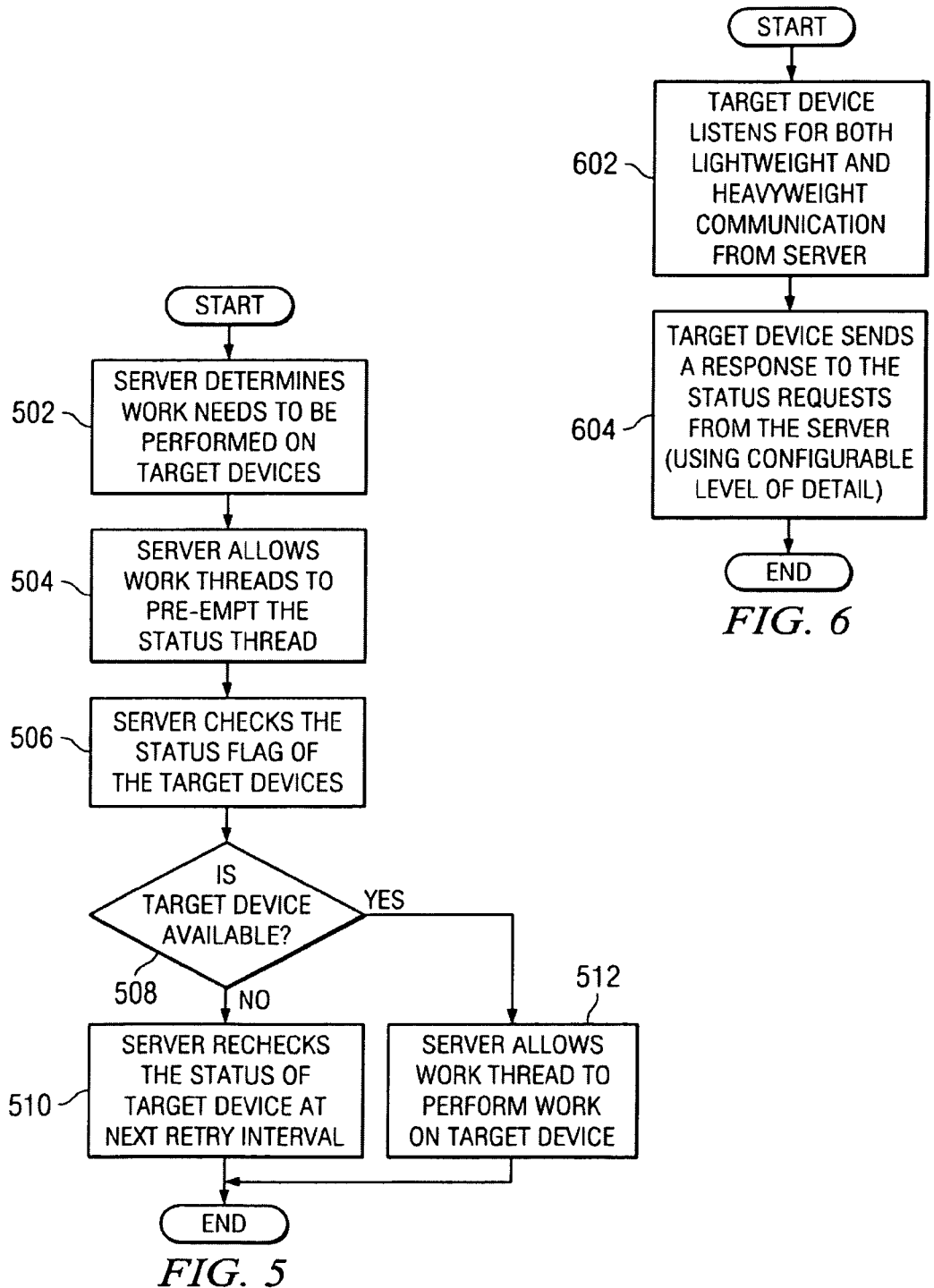

SYSTEM FOR ENERGY EFFICIENT COMPUTER MANAGEMENT ENVIRONMENT VIA TIGHTLY INTEGRATED TARGET STATUS AND DIRECTED WORK SESSIONS

BACKGROUND OF THE INVENTION

1. Field of the Invention

The present invention relates generally to an improved data processing system, and more specifically to a method and system for providing an energy efficient computer management environment via tightly integrated target device status and directed work sessions.

2. Description of the Related Art

In a computer management environment, one or more central servers or controllers are used to manage a plurality (and often a large number) of other computers called "targets". Target devices can be any type of computer device, including personal computer systems, servers, workstations, mainframes, peripherals, network devices, etc. The servers perform work on the multiple target devices within a network by interrogating, configuring, controlling, or otherwise communicating with the target devices.

The central servers typically use one of two data handling architectures, push and pull, to perform work on the multiple target devices. In a pull-based architecture, the target devices control the flow of data from the servers and pull work from one or more servers. In a push-based architecture, a server controls the flow of work to a client and pushes work out to a large number of target devices. Push-based architectures have different challenges and solutions from pull-based architectures, as well as from peer-to-peer environments where targets will spread work amongst themselves.

In many situations, the connection to a target device may not be completed because the target device is unavailable or not responsive to the server's requests. Computer maintenance is typically implemented during nighttime hours since the load on the target devices is usually minimal at that time. If a target device has been turned off at night to conserve energy, the target device will not be available to the server for the maintenance operation. Similarly, if the target device is a laptop computer, the device may not be available to the server if the user takes the device home or otherwise disconnects the device from the network. While computer management environments have always needed to be tolerant of these unreliable networks, as the cost of computer laptops decrease and the cost of energy increases, what was previously a small percentage of unreliable systems in a computer management environment is now becoming the norm as more and more users turn off or disconnect their target computer devices during typical maintenance hours to conserve energy.

BRIEF SUMMARY OF THE INVENTION

The illustrative embodiments provide a method and system for providing an energy efficient computer management environment via tightly integrated target status and directed work sessions. The illustrative embodiments query, by a lightweight communication means, an availability status of a target computer device using a status thread. The status of the target computer device is recorded in a memory of a central computer according to response from the server thread. Responsive to an absence of a response by the target computer, the illustrative embodiments query, by a heavyweight communication means, the status of the target computer device using the status thread.

BRIEF DESCRIPTION OF THE SEVERAL VIEWS OF THE DRAWINGS

FIG. 5 is a flowchart illustrating a process of a server work thread for checking target device responsiveness as set by a status thread in accordance with the illustrative embodiments; and FIG. 6 is a flowchart illustrating a process in a target device for providing status information to a central server in accordance with the illustrative embodiments.

DETAILED DESCRIPTION OF THE INVENTION

Figure 1:
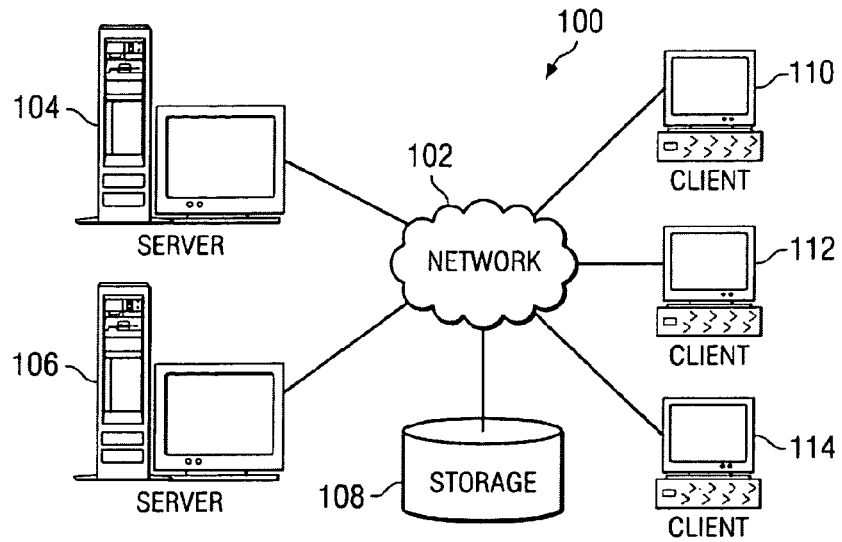
FIG. 1 depicts a pictorial representation of a distributed data processing system in which the illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
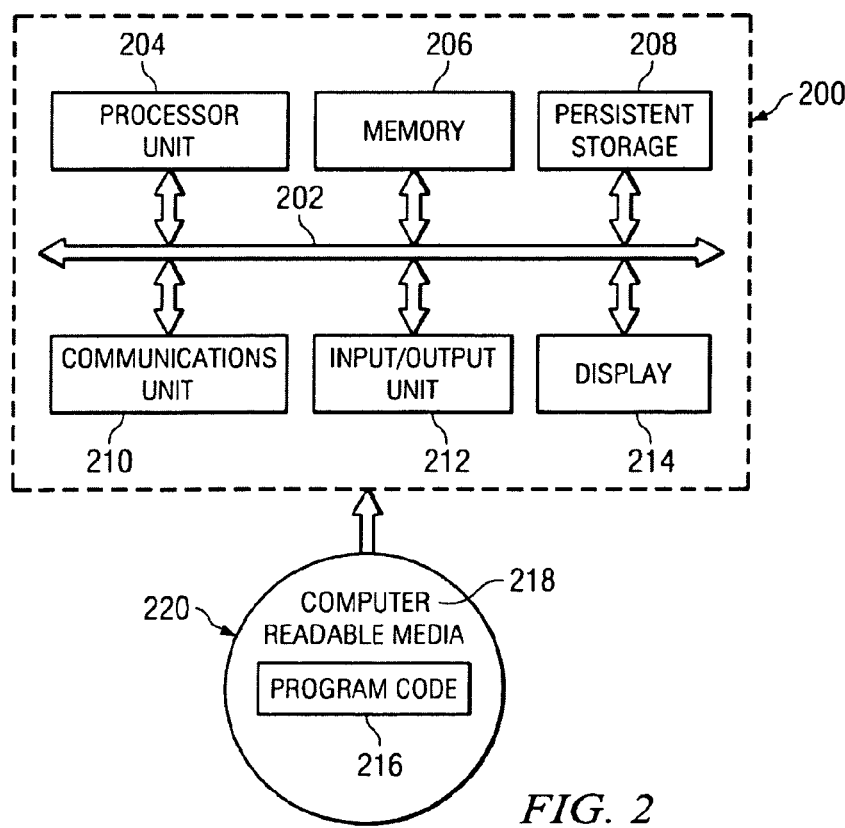
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks such as, for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions far the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In existing computer management environments, multiple work threads are commonly used on a central controller or server to communicate with multiple target devices, usually in a one-to-one correspondence called a session. Communication between the central server and a target device is usually performed via a Transmission Control Protocol/Internet Protocol (TCP/IP) connection. TCP/IP is a suite of communications protocols used to connect hosts on the Internet. A central server has a limited number of connections via work threads available to perform work on the multiple target devices. If there are more targets in the computer management environment than the number of available work threads on a central server, the remaining targets may be processed when sessions on the current targets complete. However, a problem occurs when the work sessions initiated on the target devices do not complete. A work session initiated on a target device may not compete for various reasons, including, for example, when the target device has been turned off or has been disconnected from the network. In this situation, a work thread and a TCP/IP socket is in use on the central controller until a TCP/IP timeout of the uncompleted session occurs. Since a server has a limited number of work threads available for communicating with the targets devices, and since there may be incomplete sessions which are tied up prior to the work thread being freed up by the timeout of an incomplete session, the server is limited in the effective number of targets the server can manage. Thus, the effectiveness of a server is diminished by the number of threads currently in timeout. A user managing the server must take into consideration the number of non-responsive targets and provide additional servers to perform the work needed.

Tivoli Configuration Manager (TCM) is a software product that allows for automatically scanning and collecting hardware and software configuration information from computer systems across an enterprise. Tivoli Configuration Manager provides an improvement in the management of target devices by introducing a status flag to mark the availability status of each target device. The status flag for a target is set based on previous attempts by the TCM controller to contact the target. If the status flag for a target device indicates the target device is unavailable, the controller will not attempt to perform work on the target device. If the target device initiates a connection to the controller or the controller runs a scheduled status check, the status flag of the target device will be changed back to 'available'. While the particular solution provided in the Tivoli Configuration Manager enables a controller to communicate with only those target devices that are flagged as 'available', a problem with the solution provided by the Tivoli Configuration Manager is that the same heavyweight communication protocol is used for determining the status of the target devices and the communication protocol used to perform work on the target devices. A heavyweight communication protocol is a reliable data transport mechanism which returns an acknowledgement packet from the target node to the source node for each set of data packets successfully transported from the source node to the target node. In contrast, a lightweight communication protocol does not provide reliable ordered packet delivery but offers increased network efficiency by operating without the use of acknowledgement packets. Since the solution provided by Tivoli Configuration Manager does not separate status from work, when work is in progress on the controller, the amount of status processing may be difficult to reduce as needed to lessen the load on the controller.

The illustrative embodiments provide a solution to the problems above by providing an energy efficient computer management environment for managing a large number of unreliable systems. The solution described in the illustrative embodiments utilizes status information about target devices and directed work sessions to allow for reducing the number of central servers or controllers required to manage target devices in a computing environment and to facilitate regular target device shutdown to reduce energy costs. With the illustrative embodiments, servers may manage many more unreliable target devices with fewer server resources, thus reducing the number of servers.

To manage unreliable devices in a network, a central server in the computer management environment of the illustrative embodiments implements four basic elements. The first element implemented by the central server in the computer management environment is the separation of work and status. The central server creates work threads which are used to perform work on target devices in the computer management environment. The work threads may include work that provides data or services to the target devices (e.g., a web server provides web services to requesting client devices, a mail server delivers mail, etc.), as well as work that comprises maintenance or configuration operations to be performed on the target devices. The central server also creates status threads that are separate from the work threads. The central server uses these status threads to determine the current status or availability of the target devices on which the server wants to perform work. When the central server needs to perform work on target devices, it uses the information obtained by the status threads to identify which targets are currently responsive. A work thread will only contact the target devices that are known to the server as having an available status. Separating the work threads from the status threads enables the central server to alter the amount of status processing to reduce the resource consumption of the server and conserve energy as needed, thereby guaranteeing a fixed number of work threads.

The second element implemented by the central server in the computer management environment of the illustrative embodiments is the adjustment of priority level of the status threads. The central server is allowed to change the priority level of the status threads based on the current workload on the central server. The central server allows the work threads to run at a higher priority than the status threads, thereby enabling the work threads to pre-empt the status threads as needed. The central server allows the status threads to run at varying levels of resource consumption based on the load on the central server. For example, the central server adjusts the priority of the status threads to a higher level when the central server has a low workload, and reduces the priority of the status threads to a secondary status when the central server has a high load or exceeds a certain threshold of operation. By allowing the central server to adjust the priority levels of the status threads, the resource consumption of the server may be adjusted.

The third element implemented by the central server in the computer management environment of the illustrative embodiments is the combination of lightweight and heavyweight communication protocols for the status threads. The central server may initially use a lightweight communication protocol, such as User Datagram Protocol (UDP), for determining the responsiveness or availability of the target devices. A lightweight communications protocol does not guarantee reliability or ordering in the way that a heavyweight communication protocol (e.g., Transmission. Control Protocol (TCP) does. With lightweight communication, datagrams may arrive out of order, appear duplicated, or go missing without notice. However, a lightweight communication protocol consumes fewer server resources and is more efficient than a heavyweight communication protocol since the lightweight communication protocol avoids the overhead of checking whether every packet actually arrived. The central server relies on a heavyweight communication protocol to determine the status of a target device only when an attempt to connect to the target device using a lightweight communication protocol has failed. Use of a combination of lightweight and heavyweight communication protocols to determine the availability status of the target devices enables the central server to use fewer server resources while still allowing the central server to depend on the more reliable heavyweight communication if the lightweight communications method is unsuccessful.

The fourth element implemented by the central server in the computer management environment of the illustrative embodiments is a status flag associated with each target device. Work threads of an application use the status flags to determine whether or not a target device is responsive and available. Only those targets whose status flag indicates that the target device is available will be contacted by the work threads.

The computer management environment provided in the illustrative embodiments provides several advantages over existing management systems. With the solution in the illustrative embodiments, transient target devices are allowed to drop out and come back on-line without causing any adverse affects (e.g., communications timeouts) at the central server. Since the central server will have fewer work threads and sockets tied up waiting on a communications timeout, the central server is able to increase the amount of work it can perform. The number of central servers required to be used to manage the target devices may likewise be reduced, since more targets may be managed by a central server. Thus, the illustrative embodiments provide a cost effective solution which allows for managing more targets per central server, thus reducing energy requirements by requiring fewer central servers. In addition, the solution in the illustrative embodiments allows target devices to be shut down or taken offline at night to conserve power. Companies interested in reducing energy consumption may utilize the solution in the illustrative embodiments to save power both in their data centers as well as on their desktop systems.

Figure 3:
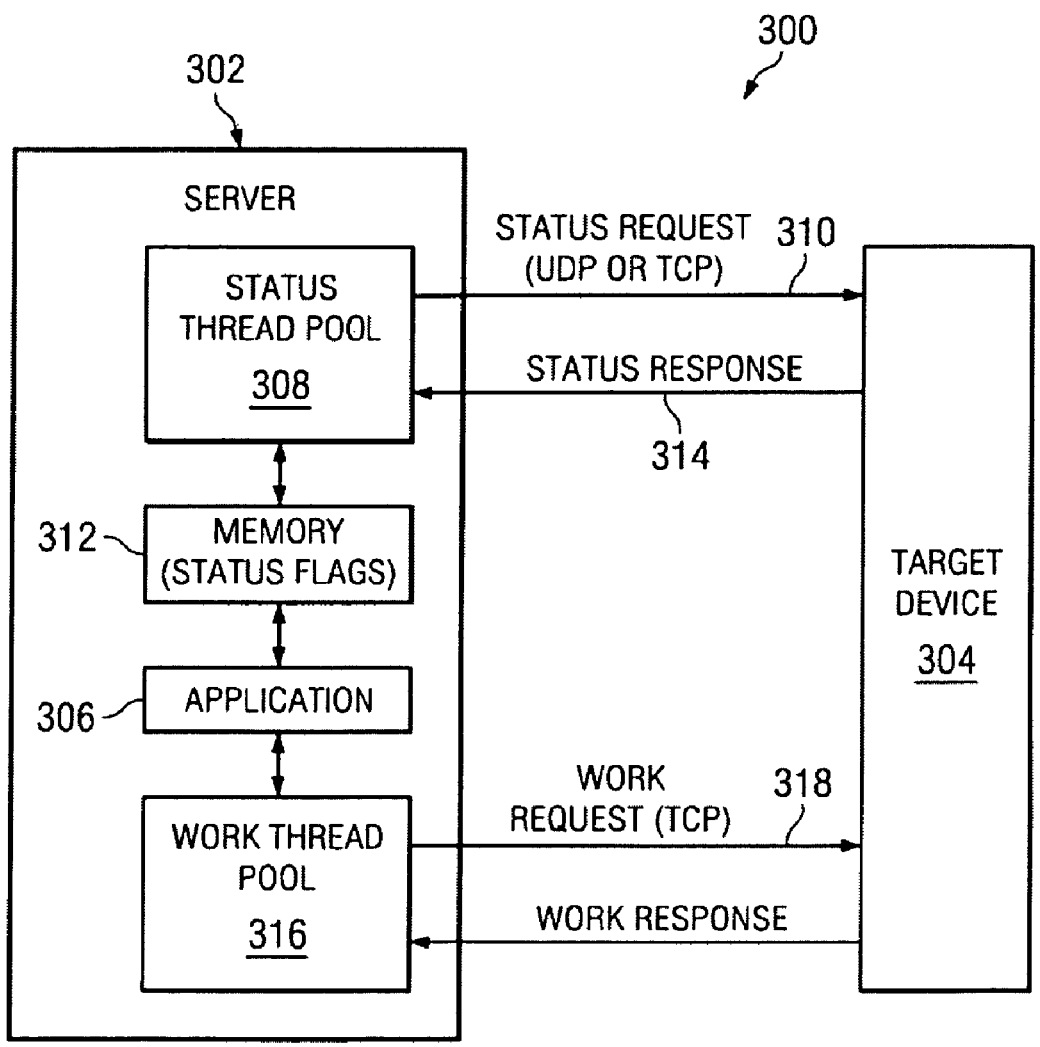
FIG. 3 is a block diagram illustrating an exemplary computer management environment in which the illustrative embodiments may be implemented.

FIG. 3 is a block diagram illustrating an exemplary computer management environment in which the illustrative embodiments may be implemented. Computer management environment 300 is shown in this example to comprise central server 302 and target device 304. Although only one target device is shown in this illustrative example, it should be understood that central server 302 may be used to control multiple target devices in computer management environment 300, and that computer management environment 300 may comprise other central servers controlling a plurality of other target devices.

Central server 302 is an example of a server-side data processing system, such as server 104 and 106 in FIG. 1. Central server 302 is responsible for initiating work commands and interpreting the work command response returned from target device 304. Target device 304 is an example of any type of computer device or peripheral, including personal computers such as clients 110, 112, and 114 in FIG. 1, other servers, workstations, mainframes, or other network devices. Target device 304 is responsible for executing the requested work commands and providing the results of the command execution to central server 302.

Central server 302 comprises an application program 306 running on its operating system. Application program 306 will periodically require work to be performed on target device 304 and/or data to be returned from target device 304 for subsequent use by application program 306. When application program 306 wants to perform work on target device 304, central server 302 connects only to those target devices in the computer management environment that the server knows will respond to the work command. Central server 302 employs a hybrid of both lightweight and heavyweight communication protocols to determine which target devices in the environment are currently responsive and available to respond to the work command. Examples of these protocol combinations include, but are not limited to, lightweight User Datagram Procotol (UDP) vs. heavyweight Transmission Control Protocol (TCP), or lightweight Multicast vs. heavyweight Secure Socket Layer (SSL).

To check the responsiveness or availability of the target devices in the management environment to determine whether or not to connect to a particular target device, central server 302 polls the status of the target devices in the management environment by using a sending thread from status thread pool 308 to send a lightweight status request to the target devices. For example, central server 302 sends status request 310 to target device 304 using a lightweight communications protocol, such as UDP. Using a lightweight communication protocol uses fewer server resources and is more efficient than using a heavyweight communication protocol when sending and reporting simple non-critical requests of the target devices. In this example, a set of status threads may be utilized, one UDP sending status thread, and one UDP listening status thread. The sending thread continuously cycles through a list of target devices.

As the central server sends a status request to a target device, the sending status thread also clears a status flag corresponding to the target device in memory 312. The status flag comprises a value used to indicate to the work threads whether or not the target device is responsive and available. For instance, if the status flag for a target device is set, the central server may connect to the target device to perform work on the device; however, if the status flag is clear, the central server will not attempt a connection to the target device at this time. The central server will recheck the status flag at a later time (e.g., in the next retry interval) and only attempt a connection with the target device when the status flag is set. Using the status flag in this manner, work threads may have a very high rate of success creating TCP/IP sessions with the target devices, and there will be fewer threads and sockets in communications timeout. The status flags may also be used to provide a snapshot in time indicating the responsiveness of the target devices in the management environment.

Target device 304 is configured to listen to both lightweight and heavyweight communications from central server 302. Upon receiving status request 310, target device 304 sends a status response 314 to the request. The response from the target device indicates to central server 302 that the target device is responsive and currently available. The type of response provided by target device 304 may depend on the particular configuration of the response mechanism of the target device. In one embodiment, the target device provides a quick status response similar to a ping. A ping is a tool used to test whether a particular host is reachable across a network by sending Internet Control Message Protocol (ICMP) request packets to the target host and listening for ICMP response replies. In another embodiment, the response mechanism is configured to instruct target device 304 to run a diagnostic test to examine and correct configuration, environmental, and program settings. Target device 304 may implement self-healing based on the results of the diagnostic test, and send the diagnostic results to central server computer 302.

A listening thread on central server 302 listens for status response 314 from target device 304. When central server 302 receives status response 314 from target device 304, the listening thread modifies the status flag corresponding to the target device to indicate that the target device is responsive and currently available. When application program 306 wants to perform work on target device 304, central server 302 checks the status flag corresponding to the target device and determines that the status flag is set. Central server 302 may then use a work thread from work thread pool 316 to connect to target device 304 and send work request 318 to perform work on the target.

In some situations, target device 304 may not be available to respond to status request 310, such as when target device 304 is turned off or otherwise disconnected from the network. If central server 302 does not receive a response from target device 304 within a certain time period (e.g., 5 seconds), the central server uses another thread from status thread pool 308 to send a heavyweight status request to the non-responsive target device. For example, central server 302 re-sends status request 310 to target device 304 using a heavyweight communications protocol, such as TCP. Status thread pool 308 may comprise n number of TCP send and receive status threads, where n is configurable by the user. If target device 304 provides a status response 314 to the heavyweight status request, central server 302 sets the status flag for the target. Central server 302 may connect to the target device if there is work to be performed on the target since the status flag indicates the target device is available. If target device 304 does not respond to the heavyweight status request, central server 302 will not connect to the target device even if there is work to be performed on the target device, since the status flag indicates the target device is not currently available.

Figure 4:
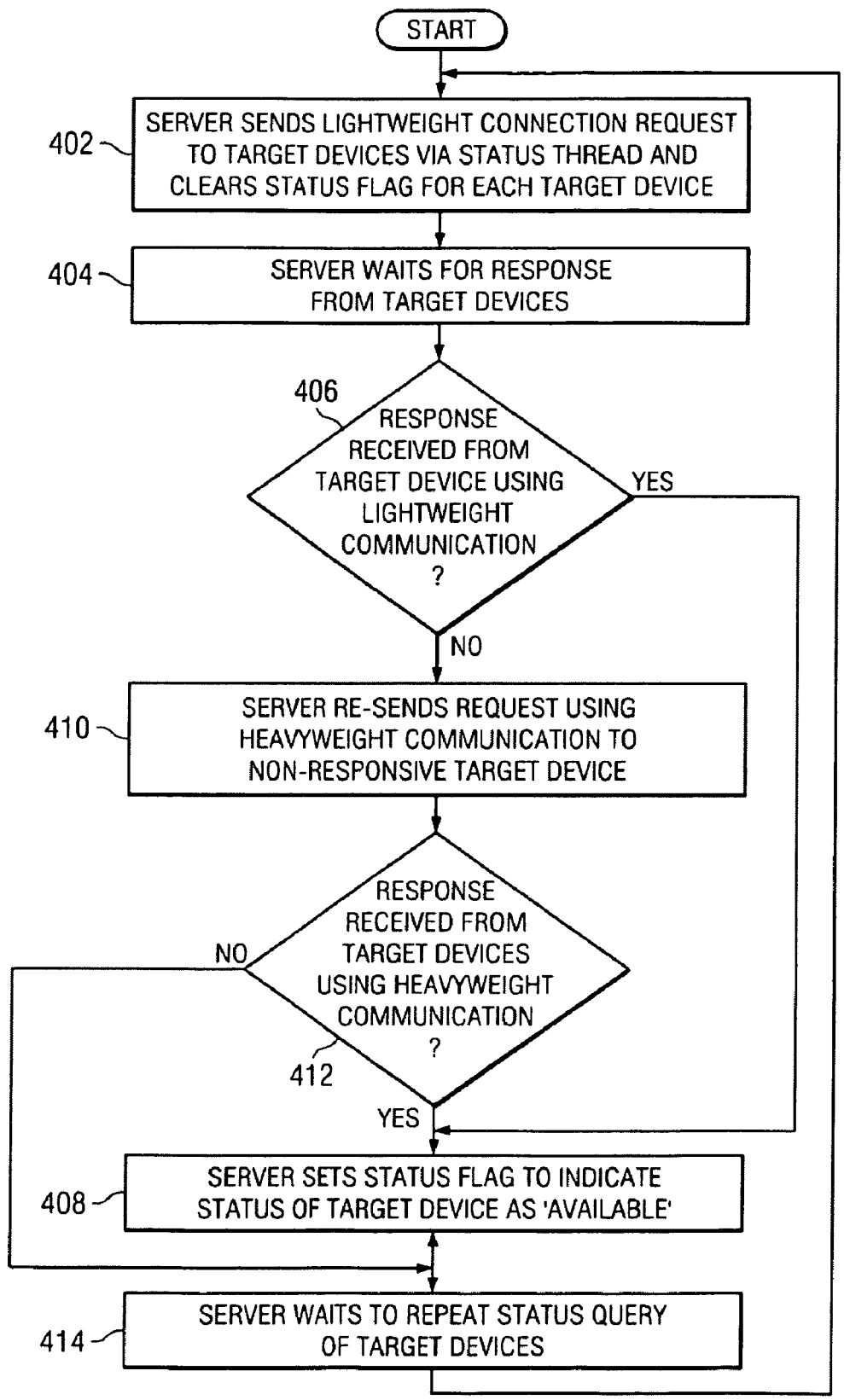
FIG. 4 is a flowchart illustrating a process of a server status thread, for determining the responsiveness of a target device in accordance with the illustrative embodiments.

FIG. 4 is a flowchart illustrating a process of a server status thread for determining the availability of a target device in accordance with the illustrative embodiments. The process described in FIG. 4 may be implemented within a server in a computer management environment, such as server 302 in FIG. 3. The process uses a hybrid of lightweight and heavyweight communication protocols to determine which target devices in the computer management environment are responsive and currently available. By enabling the server to use lightweight communication to determine the status of a target device, the server status thread is able to run more quickly than by using only heavyweight communication. However, it should be noted that the server status thread is given a lower priority than the work threads. Thus, if the work threads are busy and the server load is high, the server status thread will be pre-empted and given a secondary status to the work threads.

The process begins when the server determines the availability of target devices in the system by sending a status request via a status thread using a lightweight communication protocol (e.g., UDP) to a plurality of target devices in the computer management environment and clearing the status flag associated with each of the target devices (step 402). The status thread may be obtained from status thread pool 308 in FIG. 3. The server may query all of the target devices in the system or, alternatively, query the target devices in discrete batches. For instance, the server may create a first batch of status requests that targets only fifty devices in the system. Responsive to the status thread sending the status requests, the server then waits for a set time period in which to receive a response from the target devices (step 404).

A determination is made by the server as to whether a status response has been received from the target devices (step 406). As lightweight communication protocols are less reliable than heavyweight communication protocols, a target device may not have received the lightweight status request in order to respond to the request. If a response has been received from a target device using the lightweight communication protocol ('yes' output of step 406), the server modifies the status flag of a target device to indicate that the target device is responsive and available (step 408), and the process then continues to step 414. Thus, the server modifies the status flag of a target when the server successfully makes a connection to the target. The server may also modify the status flag of the target when the target completes the work for the session. However, if a target device has not responded to the status request ('no' output of step 406), the server then re-sends the status request using a heavyweight communication protocol (e.g., TCP) to the non-responsive target device (step 410).

A determination is then made by the server as to whether a status response corresponding to the heavyweight communication request has been received from the non-responsive target device (step 412). If a response has been received from the non-responsive target device ('yes' output of step 412), the server sets the status flag of the target device to indicate that the target device is responsive and available (step 408).

The sending status thread continuously cycles through the list of targets devices. After an attempt has been made to obtain the status of all of the target devices, the server then waits for a set amount of time (e.g., 5 minutes) to repeat the status requests of the target devices (step 414). Once this wait time period has expired, the process returns to step 402 to continue sending lightweight status requests to the target devices to maintain a current availability status of the devices.

FIG. 5 is a flowchart illustrating a process of a server work thread for checking target device availability as set by a status thread in accordance with the illustrative embodiments. The process described in FIG. 5 may be implemented in a server in a computer management environment, such as server 302 in FIG. 3. The server work thread may pre-empt the status thread when work needs to be performed on a target device and the server load is high. The server work thread only contacts the target devices having a status flag that indicates the target is currently available.

The process begins with the server determining that work needs to be performed on target devices in the computer management environment (step 502). The server allows the work threads to pre-empt the status thread since the status threads have a secondary status to the work threads (step 504). The server may pre-empt the status thread in various ways. For instance, the server may increase the time variables in the status thread. Increasing the time variables increases the wait time imposed on the status thread between invocations of the thread. The server may also change the execution priority level of the status thread based on the current workload of the server. If the server has a high workload, the status thread is given a lower priority of execution than the work threads. The server may also use a locked mutex to pre-empt the status thread. Mutexes are used to protect against concurrent accesses. For instance, a status thread that attempts to lock a mutex already locked by a work thread will suspend until the work thread unlocks the mutex.

The server uses a work thread to check the status of a target device on which work needs to be performed (step 506). A determination is made by the server whether the status flag of the target devices indicates that the target device is available (step 508). If the status flag of the target device indicates that the target device is not responsive and available ('no' output of step 508), the server does not contact the target device in the current time interval. Rather, the server rechecks the status of the target at the next retry interval (e.g., 15 minutes) (step 510). However, if the status flag of the target device indicates that the target device is responsive and available ('yes' output of step 508), the server allows the work thread to perform the work on the target device (step 512).

FIG. 6 is a flowchart illustrating a process in a target device for providing status information to the server in accordance with the illustrative embodiments. The process described in FIG. 6 may be implemented in a target device in a computer management environment, such as target device 304 in FIG. 3. The process begins with a target device in a computer management environment listening for both lightweight and heavyweight communication from the server (step 602). The lightweight and heavyweight communication comprises a request by the server to determine the availability status of the target device. If the target device is available, the target device sends a response to the server request based on a configurable level of detail (step 604). The response from the target device indicates to the server that the target is responsive and currently available. The response configuration may enable the target to provide a quick status response to the server or provide additional information to the server. For example, the response configuration may instruct the target device to run a diagnostic test, implement self-healing based on the results of the diagnostic test, and send the results of the diagnostic test to the server.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The invention can also take the form of a computer program product which has been downloaded over a network from one device to another for use in the other device. For instance, the program code stored in a computer readable storage medium in a server data processing system may be downloaded over a network from the server to a remote data processing system, such as a client or another server. Likewise, the program code stored in a computer readable storage medium in a client data processing system may be downloaded over a network from the client to a remote data processing system, such as a server or another client.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing a computer environment in an energy efficient manner, the computer implemented method comprising:
    querying, through a lightweight communication protocol, an availability status of a target computer device using a status thread;
    recording the availability status of the target computer device in a memory of a central computer according to a response from the status thread; and
    responsive to an absence of a response by the target computer, querying, through a heavyweight communication protocol, the status of the target computer device using the status thread;
    responsive to a first determination that work needs to be performed on the target computer device by one or more work threads, adjusting a priority level of the status thread to a level secondary to the one or more work threads and checking a status flag associated with the target computer device to determine if the status flag indicates the target computer device is responsive; and
    responsive to a second determination that the status flag indicates that the target computer device is responsive, establishing a heavyweight communication with the target computer device to perform the work on the target computer device.

2. The computer implemented method of claim 1, wherein the lightweight communications protocol is User Datagram Protocol, and wherein the heavyweight communications protocol is Transmission Control Protocol.

3. The computer implemented method of claim 1, further comprising:
    responding, by the target computer device, to the query by the lightweight communication protocol or the heavyweight communication protocol in a configurable manner.

4. The computer implemented method of claim 1, further comprising:
    responsive to a third determination that a load on the central computer falls below a threshold, adjusting the priority level of the status thread to a primary priority level.

5. The computer implemented method of claim 1, wherein recording the status of the target computer device further comprises:
    modifying the status flag associated with the target computer device in the memory of the central computer to indicate the target computer is currently responsive.

6. The computer implemented method of claim 1, further comprising:
    responsive to a determination that the status flag indicates that the target computer device is not responsive, delaying establishing a heavyweight communication with the target computer device to perform the work on the target computer device until a recheck of the status flag indicates that the target computer device is responsive.

7. The method of claim 1, wherein the lightweight communication protocol is a first protocol in which an acknowledgement packet is not generated in response to a successfully transmitted packet, and wherein the heavyweight communication protocol is a second protocol in which the acknowledgment packet is generated in response to the successfully transmitted packet.

8. The method of claim 1, wherein adjusting the priority level of the status thread to the priority level secondary to the one or more work threads comprises:
- locking a mutex for the one or more work threads; and
- suspending the status thread until the mutex is unlocked.

9. The method of claim 1, wherein adjusting the priority level of the status thread to the priority level secondary to the one or more work threads comprises:
- increasing an amount of time between invocations of the status thread by increasing a time variable for the status thread.

10. The method of claim 3, wherein responding, by the target computer device, to the query by the lightweight communication protocol or the heavyweight communication protocol in a configurable manner comprises:
- responsive to receiving a query for the availability status of the target computer device, performing a diagnostic test to form results;
- performing self-healing on the target computer device using the results; and
- sending the results to the central computer.

11. The method of claim 1, further comprising:
- determining whether the work needs to be performed on the target computer device by the one or more work threads, wherein the work comprises a service to be provided to the target computer device.

12. A data processing system for managing a computer environment in an energy efficient manner, the data processing system comprising:
- a bus;
- a storage device connected to the bus, wherein the storage device contains computer usable code;
- at least one managed device connected to the bus;
- a communications unit connected to the bus; and
- a processing unit connected to the bus, wherein the processing unit executes the computer usable code to query, through a lightweight communication protocol, an availability status of a target computer device using a status thread; record the availability status of the target computer device in a memory of a central computer according to a response from the status thread; query, in response to an absence of a response by the target computer, the status of the target computer device through a heavyweight communication protocol using the status thread; responsive to a first determination that work needs to be performed on the target computer device by one or more work threads, adjust a priority level of the status thread to a priority level secondary to the one or more work threads and check a status flag associated with the target computer device to determine if the status flag indicates the target computer device is responsive; and responsive to a second determination that the status flag indicates that the target computer device is responsive, establish a heavyweight communication with the target computer device to perform the work on the target computer device.

13. A computer program product for managing a computer environment in an energy efficient manner, the computer program product comprising:
- a non-transitory computer readable storage medium having computer usable program code tangibly embodied thereon, the computer usable program code comprising:
- computer usable program code for querying, through a lightweight communication protocol, an availability status of a target computer device using a status thread;
- computer usable program code for recording the availability status of the target computer device in a memory of a central computer according to a response from the status thread; and
- computer usable program code for querying, in response to an absence of a response by the target computer, the status of the target computer device through a heavyweight communication protocol using the status thread;
- computer usable program code, responsive to a first determination that work needs to be performed on the target computer device by the one or more work threads, for adjusting a priority level of the status thread to a priority level secondary to one or more work threads and checking a status flag associated with the target computer device to determine if the status flag indicates the target computer device is responsive; and
- computer usable program code, responsive to a second determination that the status flag indicates that the target computer device is responsive, for establishing a heavyweight communication with the target computer device to perform the work on the target computer device.

14. The computer program product of claim 13, wherein the lightweight communications protocol is User Datagram Protocol, and wherein the heavyweight communications protocol is Transmission Control Protocol.

15. The computer program product of claim 13, further comprising:
- computer usable program code for responding, by the target computer device, to the query by the lightweight communication protocol or the heavyweight communication protocol in a configurable manner.

16. The computer program product of claim 13, further comprising:
- computer usable program code for adjusting, in response to a determination that a load on the central computer falls below a threshold, the priority level of the status thread to a primary priority level.

17. The computer program product of claim 13, further comprising:
- computer usable program code for delaying establishing, in response to a determination that the status flag indicates that the target computer device is not responsive, a heavyweight communication with the target computer device to perform the work on the target computer device until a recheck of the status flag indicates that the target computer device is responsive.

18. The computer program product of claim 13, wherein the computer usable program code is stored in the non-transitory computer readable storage medium of a data processing system, and wherein the computer usable program code is downloaded over a network from a remote data processing system.

19. The computer program product of claim 13, wherein the computer usable program code is stored in the non-transitory computer readable storage medium of a server data processing system, and wherein the computer usable program code is downloaded over a network from a non-transitory computer readable storage medium of a remote data processing system to use with the remote data processing system.

* * * * *